US007418464B2

(12) United States Patent
Cannon et al.

(10) Patent No.: US 7,418,464 B2
(45) Date of Patent: Aug. 26, 2008

(54) METHOD, SYSTEM, AND PROGRAM FOR STORING DATA FOR RETRIEVAL AND TRANSFER

(75) Inventors: David Maxwell Cannon, Tucson, AZ (US); Donald Paul Warren, Jr., Tucson, AZ (US); Howard Newton Martin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 10/766,576

(22) Filed: Jan. 27, 2004

(65) Prior Publication Data
US 2005/0165722 A1    Jul. 28, 2005

(51) Int. Cl.
*G06F 7/00* (2006.01)
*G06F 17/00* (2006.01)
*G06F 17/30* (2006.01)
*G06F 12/00* (2006.01)

(52) U.S. Cl. .......................... 707/204; 707/10; 707/100

(58) Field of Classification Search ................. 711/118; 707/100, 200, 1, 10, 101, 204
See application file for complete search history.

(56) References Cited

U.S. PATENT DOCUMENTS 5,276,867 A * 1/1994 Kenley et al. ............... 707/204

(Continued)

FOREIGN PATENT DOCUMENTS

EP           0341037 A     11/1989

OTHER PUBLICATIONS

PCT Search Report, PCT/EP2004/053694, filed Dec. 23, 2004.

(Continued)

*Primary Examiner*—Don Wong
*Assistant Examiner*—Merilyn P Nguyen
(74) *Attorney, Agent, or Firm*—William K. Konrad; Konrad Raynes & Victor LLP

(57) ABSTRACT

Provided is a method, system and program for storing data for later retrieval and for transfer within a storage hierarchy. A data storage subsystem stores both individual user files and also managed files, each managed file comprising an aggregation of multiple user files. After receiving user files from a client station, the subsystem stores user files in a retrieval storage pool to facilitate file retrieval. Criteria are subsequently applied to the user files stored in the retrieval storage pool to delete low or lower priority files from the retrieval storage pool. In addition, user files are aggregated in managed files for transfer to another location within the storage hierarchy.

14 Claims, 10 Drawing Sheets

U.S. PATENT DOCUMENTS

| | | | | |
|---|---|---|---|---|
| 5,537,585 | A * | 7/1996 | Blickenstaff et al. | 707/205 |
| 5,659,614 | A | 8/1997 | Bailey, III et al. | |
| 5,778,395 | A * | 7/1998 | Whiting et al. | 707/204 |
| 6,088,706 | A * | 7/2000 | Hild | 707/202 |
| 6,098,074 | A * | 8/2000 | Cannon et al. | 707/200 |
| 6,223,224 | B1 | 4/2001 | Bodin | |
| 6,442,601 | B1 | 8/2002 | Gampper et al. | |
| 6,453,319 | B1 * | 9/2002 | Mattis et al. | 707/100 |
| 6,754,773 | B2 * | 6/2004 | Ulrich et al. | 711/118 |
| 6,880,051 | B2 * | 4/2005 | Timpanaro-Perrotta | 711/162 |
| 7,020,668 | B2 * | 3/2006 | Matsuda et al. | 707/206 |
| 7,051,044 | B1 * | 5/2006 | Fera et al. | 707/104.1 |
| 7,124,152 | B2 * | 10/2006 | Fish | 707/204 |
| 2002/0087623 | A1 * | 7/2002 | Eatough | 709/203 |
| 2002/0099691 | A1 | 7/2002 | Lore et al. | |
| 2002/0165941 | A1 | 11/2002 | Gahan et al. | |
| 2003/0065882 | A1 | 4/2003 | Beeston et al. | |

OTHER PUBLICATIONS

PCT Written Opinion, PCT/EP2004/053694, filed Dec. 23, 2004.

IBM Corporation, "Limited Replacement and Migration Controls", *IBM Technical Disclosure Bulletin*, vol. 26, No. 3B, Aug. 1983, pp. 1746-1747.

IBM Corporation, "Identification of Timeout Parameter for Switching Cartridge Disposition", *IBM Technical Disclosure Bulletin*, vol. 35, No. 2, Jul. 1992, pp. 85-91.

IBM Corporation, "Sort Process for Migration- Storage to Optical Versus Tape", *IBM Technical Disclosure Bulletin*, vol. 36, No. 10, Oct. 1993, pp. 367-370.

* cited by examiner

METHOD, SYSTEM, AND PROGRAM FOR STORING DATA FOR RETRIEVAL AND TRANSFER

BACKGROUND

1. Field

The present description relates to a method, system, and program for storing data in a manner which facilitates data retrieval and transfer.

2. Description of Related Art

There are various known techniques for backing up data. These backup techniques are often implemented using a storage-management server which can store data objects such as user files in one or more locations often referred to as storage pools. The storage-management server frequently uses a database for tracking information about the stored objects, including the attributes and locations of the objects in the storage pools.

One backup technique typically includes a "tape rotation" procedure, in which full, differential and incremental backups are made from a machine at a client node to a storage such as tape storage. A full backup of all of the objects stored on a client node is usually made on a periodic basis (e.g., weekly). During each cycle from one full backup to the next full backup, differential backups may be made in which objects which have changed since the last full backup are backed up. Also incremental backups may be made in which objects which have changed since the last backup operation are backed up. These differential or incremental backups are typically performed on a more frequent basis than full backups. For example, differential or incremental backups may be performed daily. After some number of cycles of full, differential and incremental backups, tapes from the earliest cycle are often reused.

In this approach, every object on the client machine is typically backed up every time a full backup is made, which can result in substantial network traffic and demands for storage on the storage-management server. Another approach which is used by some storage-management servers, such as the Tivoli Storage Manager™ (TSM™) product marketed by International Business Machines Corporation (IBM), utilizes a "progressive incremental" methodology, in which objects are backed up once from a client node and thereafter are typically not backed up again unless the object changes. In combination with the progressive incremental procedures, object-level policy rules may be used to control the retention time and the number of versions which are maintained for stored objects. For example, the storage-management server can be configured to retain an "active" version, that is, an object currently residing on the client node, and a specified number of inactive versions, that is, objects that once resided on the client node but have since been deleted or modified.

Still further, a storage pool hierarchy may be implemented which allows data to be stored on a range of devices having varying characteristics such as cost and performance. Certain policies for managing data can be applied at the storage pool level to determine the appropriate device upon which objects are to be stored.

After being stored on the storage-management server, data objects can be moved and copied using data-transfer operations such as migration in which objects are moved from one storage pool to another storage pool. For example, an object may be migrated from relatively fast and expensive storage such as a disk to relatively slow and inexpensive storage such as tape. Additional data transfer operations include storage pool backups in which objects in one storage pool are duplicated or copied to another pool for availability and recovery purposes.

Various techniques have been applied or proposed to increase operational efficiency. For example, storage pools for sequential-access media such as magnetic tape can be configured for "collocation" which causes the storage-management server to group data for the same client node on the same tape or tapes. Also, small objects on the storage-management server can be aggregated together into a single entity as they are received by the storage-management server. U.S. Pat. No. 6,098,074 describes an aggregation technique in which objects being stored are aggregated into a "managed file." The objects may thereafter be tracked and moved as a single managed file within the storage hierarchy. When appropriate, individual objects can be processed individually such as for deletion or retrieval operations.

Further improvements in data storage may be useful in a variety of applications.

SUMMARY OF ILLUSTRATED EMBODIMENTS

Provided is a method, system and program for storing data. A data storage subsystem stores both individual user files and also managed files, each managed file comprising an aggregation of one or multiple user files. Received user files from a client station are stored in a retrieval storage pool. Criteria are applied to user files stored in the retrieval storage pool to delete low or lower priority files from the retrieval storage pool. In addition, user files are aggregated in managed files.

In one embodiment, active files are designated high priority files and inactive files are designated low priority files. The active files may be retained in the retrieval storage pool and the inactive files may be deleted from the retrieval storage pool.

In another embodiment, criteria are applied to received user files to store high priority files in the retrieval storage pool. Low priority user files are aggregated and stored in an aggregation storage pool.

In one embodiment, user files received from a first client station are designated high priority files for storage in the retrieval pool. User files received from a second client station are designated low priority files for aggregation and storage in an aggregation storage pool.

There are additional aspects to the present disclosure. It should therefore be understood that the preceding is merely a brief summary of some embodiments and aspects of the present descriptions. Additional embodiments and aspects are referenced below. It should further be understood that numerous changes to the disclosed embodiments can be made without departing from the spirit or scope of this description. The preceding summary therefore is not meant to limit the scope of this description.

BRIEF DESCRIPTION OF THE DRAWINGS

Referring now to the drawings in which like reference numbers represent corresponding parts throughout.

DETAILED DESCRIPTION OF ILLUSTRATED EMBODIMENTS

Figure 1:
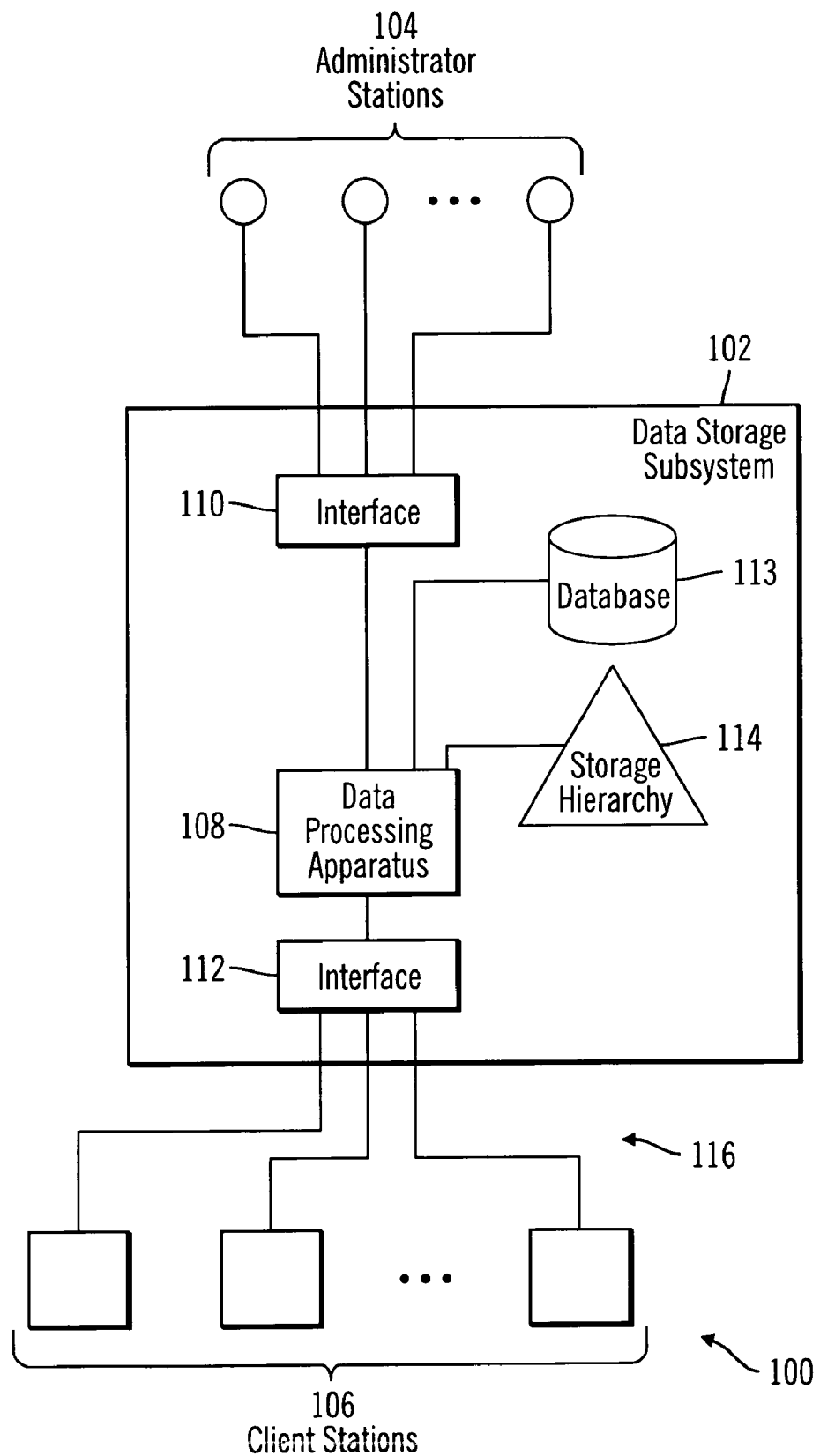
FIG. 1 illustrates an example of a computing environment in which aspects of the illustrated embodiments may be implemented.

In the following description, reference is made to the accompanying drawings which form a part hereof and which illustrate several embodiments. It is understood that other embodiments may be utilized and structural and operational changes may be made without departing from the scope of the present invention.

One aspect of the description provided herein concerns a storage management system, which may be embodied by various hardware components and interconnections. One example is shown by the storage management system 100 of FIG. 1. Broadly, the system 100 includes a data storage subsystem 102, one or more administrator stations 104, and one or more client stations 106. The subsystem 102 operates in response to directions of the client stations 106, as well as the administrator stations 104.

The administrator stations 104 are used by system administrators to configure, monitor, and repair the subsystem 102. Under direction of an end user, the client stations 106 use the subsystem 102 to store and manage data on their behalf. More particularly, each client station 106 creates and regards data in the form of "user files". In this regard, each client station 106 separately employs the subsystem 102 to archive, backup, retrieve, and restore its user files. Accordingly, each user file is associated with a single client station 106, which is the source of that user file.

Each client station 106 may comprise any general purpose computer, such as an RS-6000 based workstation, Intel-processor based personal computer, mainframe computer, etc. The client stations 106 may comprise similar or different machines, running the similar or different operating systems. Some exemplary operating systems include AIX™, UNIX, OS/2, WINDOWS™, etc.

The client stations 106 are interconnected to the subsystem 102 by a network 116. The network 116 may comprise any desired connection, including one or more conductive wires or busses, fiber optic lines, data communication channels, wireless links, internet connections, telephone lines, Storage Area Network (SAN), Local Area Network (LAN), Intranet, the Internet, Wide Area Network (WAN), etc. Preferably, a high speed communication channel such as a T3 link is used, employing a network protocol such as TCP/IP.

The administrator stations 104 comprise electronic equipment for a human or automated storage administrator to convey machine-readable instructions to the subsystem 102. Thus, the stations 104 may comprise processor-equipped general purpose computers or "dumb" terminals, depending upon the specific application.

In an exemplary embodiment, the data storage subsystem 102 may comprise a commercially available server such as the Tivoli Storage Manager™ (TSM™) product distributed by IBM, which has been modified to operate in accordance with the description provided herein. However, since other hardware arrangements may be used as well, a generalized view of the subsystem 102 is discussed below.

The data storage subsystem 102 includes a data processing apparatus 108, having a construction as discussed in greater detail below. The data processing apparatus 108 exchanges signals with the network 116 and the client stations 106 via an interface 112, and likewise exchanges signals with the administrator stations 104 via an interface 110. The interfaces 110, 112 may comprise any suitable device for communicating with the implemented embodiment of client station and administrator station. For example, the interfaces 110, 112 may comprise ETHERNET cards, small computer system interfaces ("SCSIs"), parallel data ports, serial data ports, telephone modems, fiber optic links, wireless links, etc.

The data processing apparatus 108 is also coupled to a database 113 and a storage hierarchy 114. As discussed in greater detail below, the storage hierarchy 114 is used to store selected individual user files in a nonaggregated collection. In addition, the storage hierarchy is used to store "managed files". Each managed file typically includes multiple constituent user files stored together as an "aggregate" file. However, in some instances, a managed file may be an individual user file (stored as such). The subsystem's storage of user files in nonaggregated and aggregated form may protect these files from loss or corruption on the client's machine, assist the clients by freeing storage space at the client stations, and may also provide management of client data. In this respect, operations of the storage hierarchy 114 may include "archiving" files from the client stations 106, "backing up" files of the client stations 106 to the storage hierarchy 114, "retrieving" stored files for the client stations 106, and "restoring" files backed-up on the hierarchy 114. As will be explained in greater detail below, storing selected user files in non-aggregated form can facilitate data management functions including restoration of backed up files while storing user files in aggregated form can promote efficient data transfer within the hierarchy 114.

The database 113 contains information about the files contained in the storage hierarchy 114. For example, as described in U.S. Pat. No. 6,098,074, this information may include the addresses at which managed files are stored in the storage hierarchy 114, various characteristics of the stored data, certain client-specified data management preferences, etc. The contents of the database 113 are discussed in detail below.

Figure 2:
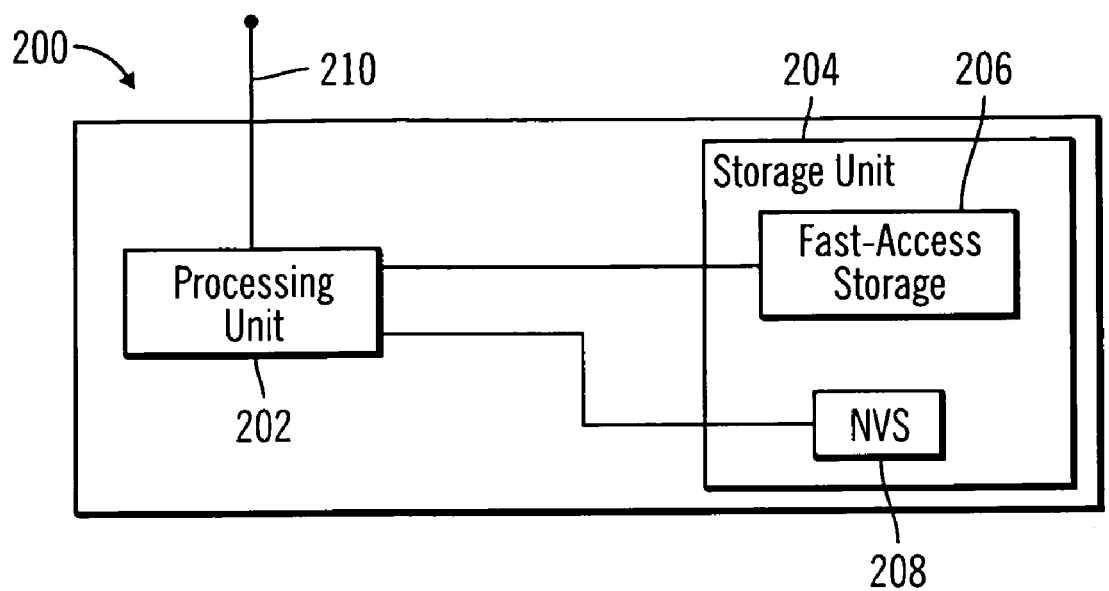
FIG. 2 is a schematic diagram of a digital data processing machine of the embodiment of FIG. 1.

The data processing apparatus 108 may be embodied by various hardware components and interconnections. FIG. 2 shows one example, in the form of a digital data processing apparatus 200.

The apparatus 200 includes a processing unit 202, such as a microprocessor or other processing machine, coupled to a storage unit 204. In the present example, the storage unit 204 includes one or more storage devices such as a fast-access storage 206 and a nonvolatile storage 208. The fast-access storage 206 preferably comprises random access memory, and may be used to store programming instructions executed by the processing unit 202. The nonvolatile storage 208 may comprise, for example, one or more magnetic data storage disks such as a "hard drive", a tape drive, or any other suitable storage device. The apparatus 200 also includes at least one input/output 210, such as a line, bus, cable, electromagnetic link, or other means for exchanging data between the processing unit 202 and other components of the subsystem 102.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206 or 208 may be eliminated; furthermore, the storage unit 204 may be provided on-board the processing unit 202, or even provided externally to the apparatus 200.

Figure 4:
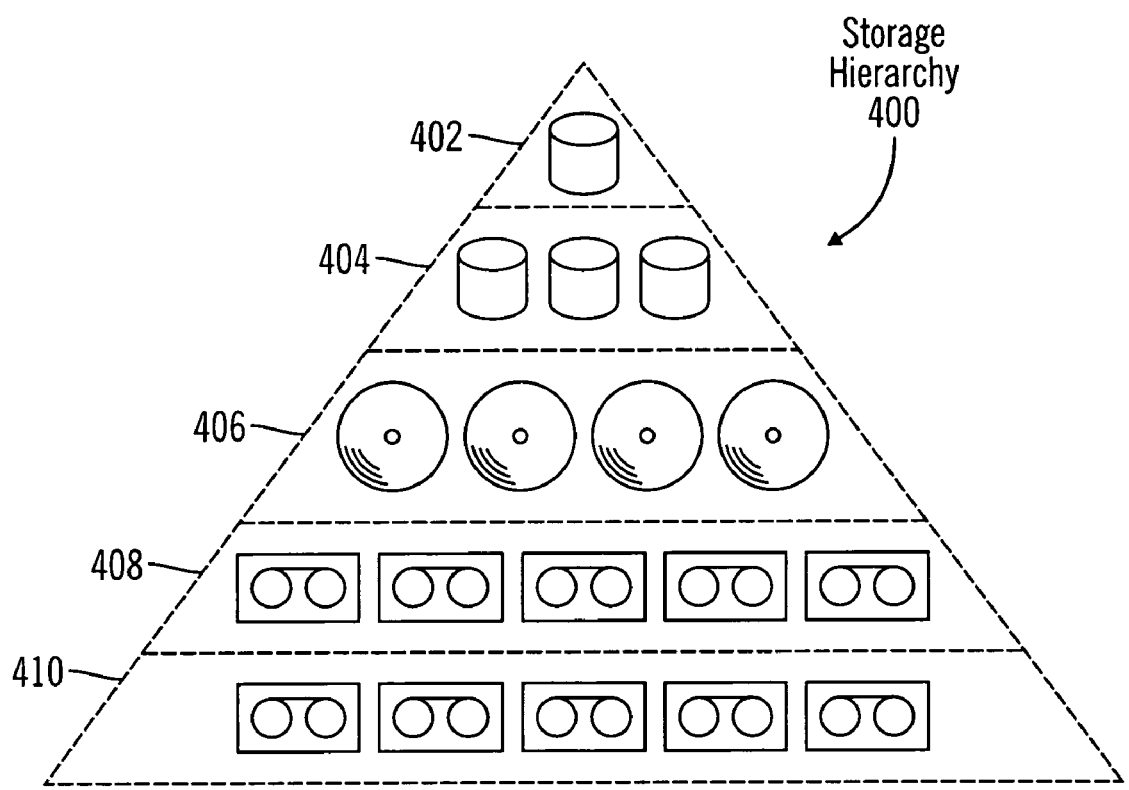
FIG. 4 is a schematic diagram showing the subcomponents of an illustrative storage hierarchy in accordance with described embodiments.

The storage hierarchy 114 may be implemented in storage media of various number and characteristics, depending upon the clients' particular requirements. To specifically illustrate one example, FIG. 4 depicts a representative storage hierarchy 400. The hierarchy 400 includes multiple levels 402-410, where successively higher levels represent incrementally higher storage performance. The levels 402-410 provide storage devices with a variety of features and performance characteristics.

In this example, the first level 402 includes high-speed storage devices, such as magnetic hard disk drives, writable optical disks, or other direct access storage devices ("DASDs"). The level 402 provides the fastest data storage and retrieval time among the levels 402-410, albeit the most expensive. The second level 404 includes DASDs with less desirable performance characteristics than the level 402, but with lower expense. The third level 406 includes multiple optical disks and one or more optical disk drives. The fourth and fifth levels 408-410 include even less expensive storage means, such as magnetic tape or another sequential access storage device.

The levels 408-410 may be especially suitable for inexpensive, long-term data archival, whereas the levels 402-406 are appropriate for short-term fast access data storage. As an example, one or more devices in the level 402 and/or level 404 may even be implemented to provide a data storage cache.

Devices of the levels 402-410 may be co-located with the subsystem 102, or remotely located, depending upon the user's requirements. Thus, storage devices of the hierarchy 400 may be coupled to the data processing apparatus 108 by a variety of means, such as one or more conductive wires or busses, fiber optic lines, data communication channels, wireless links, internet connections, telephone lines, SCSI connection, ESCON connect, etc.

Although not shown, the hierarchy 400 may be implemented with a single device type, and a corresponding single level. Ordinarily skilled artisans will-recognize the "hierarchy" being used illustratively, since the description provided herein includes but does not require a hierarchy of storage device performance.

In the context of the storage hierarchy 114/400, the term "storage pool" is used to identify one or more storage devices with similar performance characteristics. For instance, the level 404 may be comprised of several storage pools, each pool including one or more DASDs.

Figure 5:
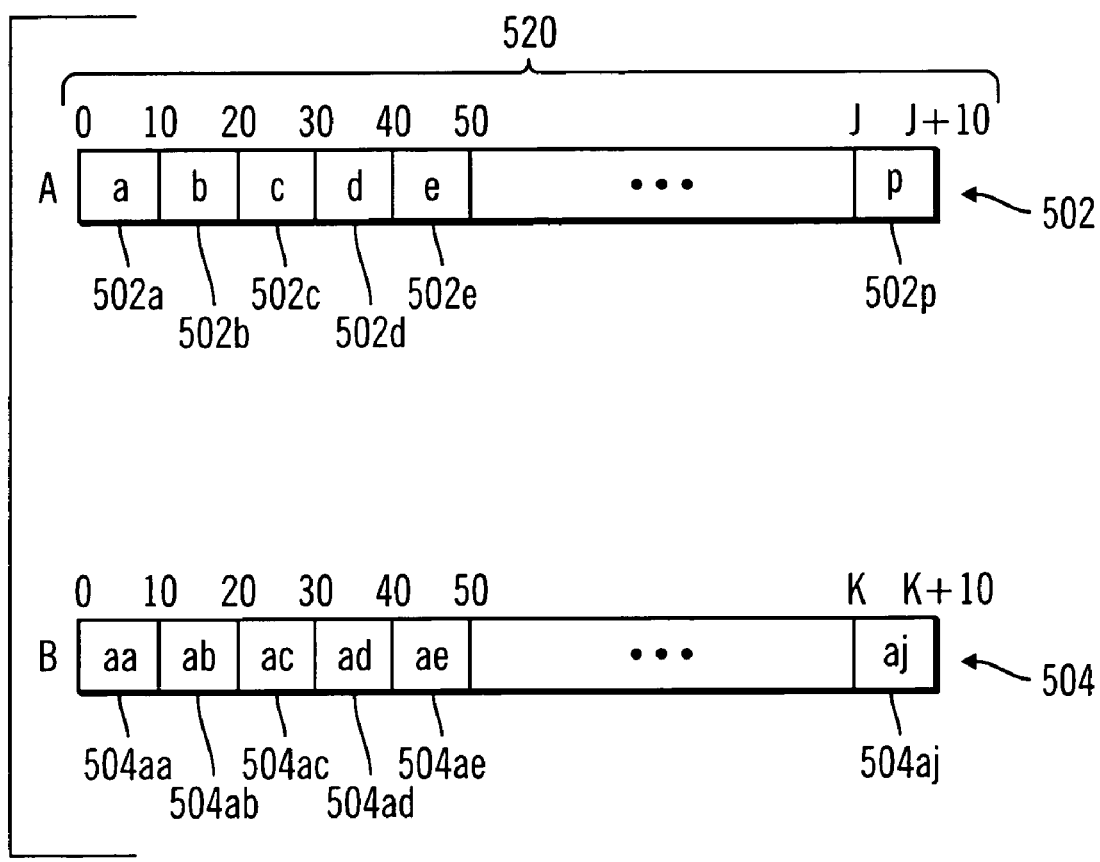
FIG. 5 is a schematic diagram showing the interrelationship of various illustrative user files and managed files.

For further explanation of managed files, FIG. 5 shows an exemplary set of four managed files 502-504. Managed files are also referenced by corresponding alphabetic designators A-B, for simpler representation in various tables referenced below. For ease of explanation, upper case alphabetic designators refer to aggregate files, whereas lower case designators point out user files.

The managed file 502 includes multiple user files 502a-502p (also identified by alphabetic designators a-p). The user files 502a-502p may be stored contiguously, that is, adjacent to each other when aggregated. In addition, the contiguous files may be stored without unused space between the adjacent files to conserve storage space. However, some empty storage space within a managed file may occur such as when a constituent user file of the managed file is subsequently deleted.

The position of each user file in the managed file 502 is denoted by a corresponding one of the "offsets" 520. In an exemplary implementation, the offsets may represent bytes of data. Thus, the first user file 502a has an offset of zero bytes, and the second user file 502b has an offset of ten bytes. In the simplified example of FIG. 5, all user files are ten bytes long. FIG. 5 also depicts managed file 504 which includes various user files. Managed files 502 and 504 include different sets of user files as shown in FIG. 5.

As previously mentioned, the database 113 is composed of various information including tables that store information about data contained in the storage hierarchy 114. These tables include: an inventory table, a storage table, a mapping table, and a managed file attributes table. Each table provides a different type of information, exemplified in the description below. Ordinarily skilled artisans (having the benefit of this disclosure) will quickly recognize that the tables described below are merely examples, that this data may be integrated, consolidated, or otherwise reconfigured, and that their structure and contents may be significantly changed, all without departing from the scope of the present descriptions. For example, instead of tables, this data may be organized as one or more object-oriented databases.

The information stored in the tables may be used in whole or in part, alone or in combination with other information, to identify whether particular user files are to be stored in either or both of retrieval storage pools and aggregation storage pools as described above. Furthermore, the information stored in the tables may be used in whole or in part, alone or in combination with other information, to identify whether particular user files are to be culled from a retrieval storage pool and deleted.

In the illustrated embodiment, one table in the database 113 is an inventory table, an example of which is depicted in Table 1 of U.S. Pat. No. 6,098,074. The inventory table of this example contains information specific to each user file stored in the subsystem 102, regardless of the location and manner of storing the user files. Generally, the inventory table cross-references each user file with various "client" information and various "policy" information. More particularly, each user file is listed by its filename, which may comprise any alphabetic, alphanumeric, numeric, or other code uniquely associated with that user file. The inventory table contains an entry for each user file.

The client information includes information relative to the client station 106 with which the user file is associated. In the illustrated example, the client information is represented by "client number", "client type", and "source" fields in each record. For each user file, the "client number" field identifies the originating client station 106. This identification may include a numeric, alphabetic, alphanumeric, or other code. The "client type" field associates the client with one or more predetermined categories, such as different computer types, operating systems, communications parameters, etc. The "source" field lists a location in the client station 106 where the user file is stored locally by the client. As a specific example, a user file's source may comprise a directory in the client station.

The policy information includes information concerning the client's preferences for data management by the subsystem 102. Optimally, this information includes the client's preferences themselves, as well as information needed to implement these preferences. In the illustrated example, the policy information is represented by "data retention time" as well as other fields, listing a maximum number of backup versions to maintain, timestamps of backed-up data, etc.

Another table in the database 113 is the storage table, an example of which is depicted in Table 2 of U.S. Pat. No. 6,098,074. In contrast to the inventory table (described above), the storage table contains information about where each managed file is stored in the storage hierarchy 114. The storage table contains an entry for each managed file.

In the illustrated example, the storage table includes "managed filename", "storage pool", "volume", "location", and other fields in each record. The "managed filename" field lists the filename for each managed file. Like the user files, each managed file has a filename that comprises a unique alphabetic, alphanumeric, numeric, or other code. For each managed file, the "storage pool" identifies a subset of the storage hierarchy 114 where the managed file resides. As mentioned above, each "storage pool" is a group of storage devices of the storage hierarchy 114 having similar performance characteristics. For instance, each of the DASDs 402, DASDs 404, optical disks 406, tapes 408, and tapes 410 may be divided into one or more storage pools. Identification of each storage pool may be made by numeric, alphabetic, alphanumeric, or another unique code. In the illustrated example, numeric codes are used.

The "volume" field identifies a sub-part of the identified storage pool. In the data storage arts, data is commonly grouped, stored, and managed in "volumes", where a volume may comprise a tape or a portion of a DASD. The "location" field identifies the corresponding managed file's location within the volume. As an example, this value may comprise a track/sector combination (for DASDs or optical disks), a tachometer reading (for magnetic or optical tape), etc.

Another table in the database 113 is the mapping table, an example of which is depicted in Table 3 of the U.S. Pat. No. 6,098,074. Generally, this table operates to bidirectionally cross-reference between managed files and user files. The mapping table identifies, for each managed file, all constituent user files. Conversely, for each user file, the mapping table identifies one or more managed files containing that user file. In this respect, the specific implementation of Table 3 includes a "managed→user" field and a "user→managed" field.

The "managed→user" field contains multiple entries for each managed file, each entry identifying one constituent user file of that managed file. Each entry identifies a managed/user file pair by the managed filename ("managed filename" field) and the user filename ("user filename").

Conversely, each entry of the "user→managed" field lists a single user file by its name ("user filename" field), cross-referencing this user file to one managed file containing the user file ("managed filename"). If the user file is present in additional managed files, the mapping table contains another entry for each additional such managed file. In each entry, identifying one user/managed file pair, the record's user file is also cross-referenced to the user file's length ("length" field) and its offset within the aggregated file of that pair ("offset" field). In this example, the length and offset are given in bytes.

The database 113 may also be implemented to include a number of other tables, if appropriate, the content and structure being apparent to those of ordinary skill in the art (having the benefit of this disclosure). Some or all of these tables, for instance, may be added or incorporated into various existing tables discussed above. In one embodiment, the database 113 includes a backup directory table that indicates whether, for storage pool backup operations, each device or medium in the storage hierarchy 114 is designated as a primary device, designated as a backup device, or has no designation yet.

Figure 6:
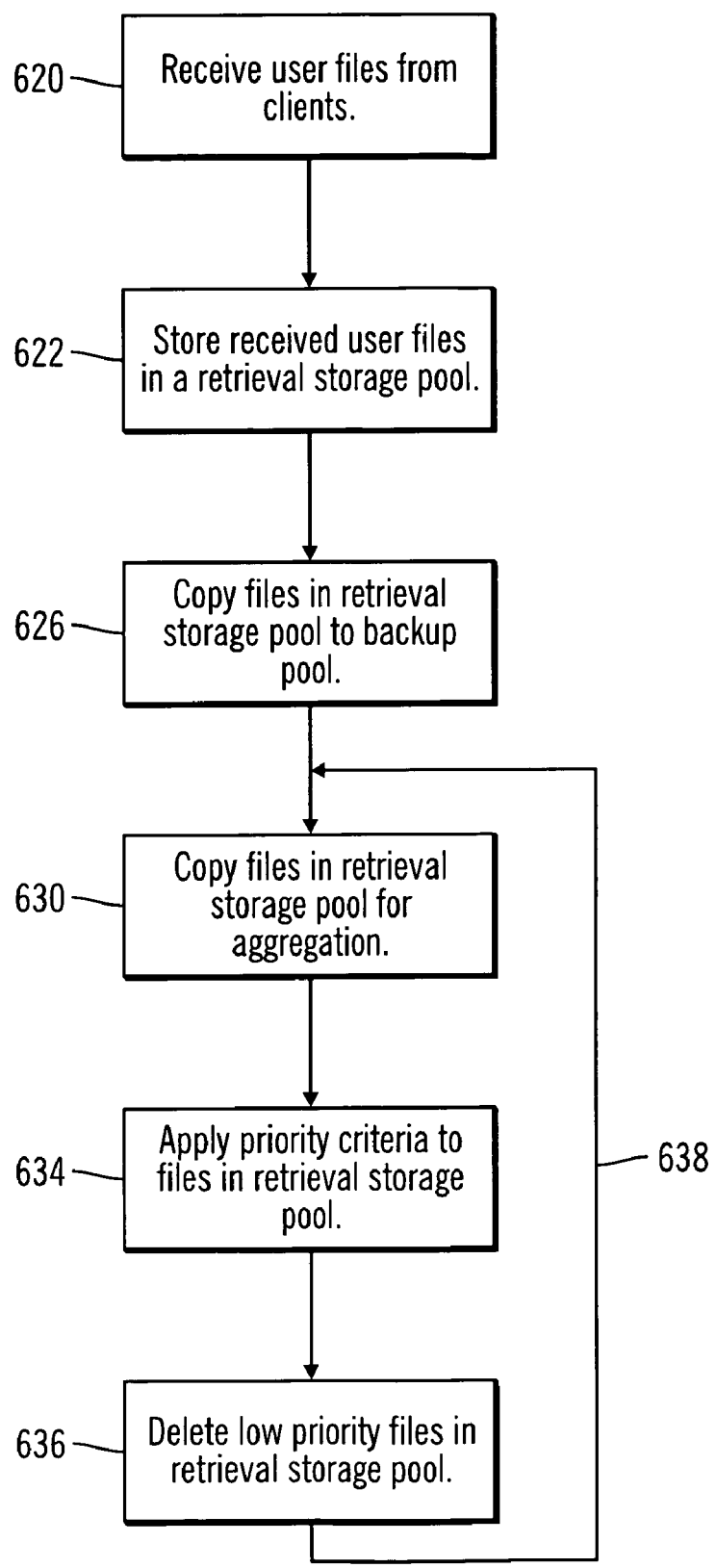
FIG. 6 shows illustrative operations of an example of a data storage subsystem in accordance with described embodiments.

FIG. 6 shows an example of operations of a data storage subsystem 102 which stores both non-aggregated user files and aggregated user files to facilitate data management operations and internal data transfers within the data storage hierarchy 114. Upon the receipt (block 620) of user files from one or more client stations 106, the user files may be stored (block 622) in nonaggregated form as individual user files in a storage pool 724 as schematically represented in FIG. 7A.

The storage pool 724 may be implemented with any type of storage device. However, in many applications, a storage device of a type similar to the first level 402 which includes high-speed storage devices, such as magnetic hard disk drives which provide fast data storage and retrieval time, may be appropriate for the storage pool 724. In one embodiment, the individual user files stored in the storage pool 724 may be used for a variety of data management functions including being retrieved to restore files on client stations 106 and other purposes. Thus, for convenience, the storage pool 724 will be referred herein also as a retrieval storage pool 724.

Figure 7:
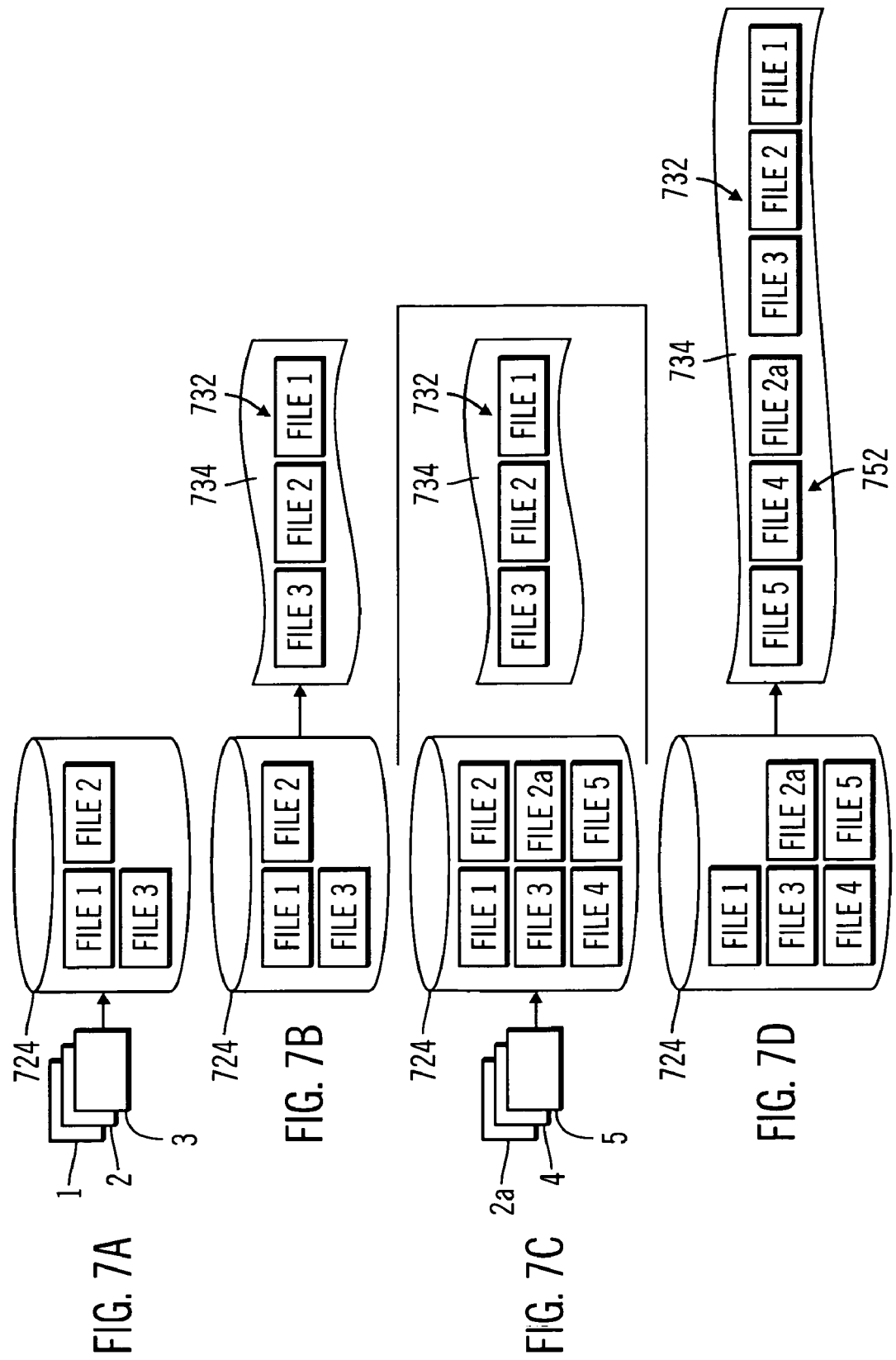
FIGS. 7A-7D illustrate an example of file culling and aggregation operations in accordance with described embodiments.

FIG. 7A shows an example of three files, file 1, file 2, and file 3, from a client station 106, arriving (block 620 FIG. 6) at the data storage subsystem 102 and being stored (block 622) in the retrieval storage pool 724. Although three files are being shown being processed, it should be appreciated that the number of files received and processed may number in the tens, hundreds or thousands, depending upon the particular application.

In one embodiment, the user files may also be copied (block 626) to another storage pool for backup purposes should the retrieval storage pool 724 fail or for other data management purposes. The backup copying operations may be performed serially or in parallel with other operations of the data storage subsystem 102 described herein.

In another aspect, the files stored in the retrieval storage pool 724 may also be copied (block 630) for aggregation into a managed file. The managed file may subsequently be transferred in a data transfer operation such as a storage pool backup, a restore or reclamation operation or a movement to another pool. Movement of a managed file includes migration to another location within the hierarchy 114. Thus, for example, FIG. 7B shows the files, file 1, file 2 and file 3 aggregated as a managed file 732 and migrated to a tape drive 734 of the hierarchy 114. The subsystem 102 treats each managed file as a single file during migration, backup, and other subsystem operations, which can reduce the file management overhead to that of a single file.

In another aspect of the illustrated embodiments, criteria are applied (block 634, FIG. 6) to the individual user files stored in the retrieval storage pool 724. In one embodiment, criteria are applied to distinguish individual user files in groups of varying degrees of priority. The low or lower priority user files may then be culled from the retrieval storage pool 724 by "deleting" (block 636) those user files from the retrieval storage pool 724, leaving the high or higher priority user files in the retrieval storage pool 724.

For example, active user files could be designated (block 634) as high priority files and inactive files could be designated as low priority files. The low priority user files may then be deleted (block 636), leaving the active user files in the retrieval storage pool 724. In this manner, space in the retrieval storage pool 724 may be conserved for the higher priority files. In addition, for restore operations which utilize active files, such restore operations can be facilitated since the active user files may be readily found in and retrieved from the retrieval storage pool 724, reducing or eliminating the need to access managed files within the hierarchy 114. As explained below, a variety of criteria may be used to define groups of varying priority.

FIG. 7C shows an example of another three files, file 2a, file 4, and file 5 from a client station 106, arriving (block 620 FIG. 6) at the data storage subsystem 102 and being stored (block 622) in the retrieval storage pool 724. In this example, file 2a is a modified version of file 2 previously received by the subsystem 102. Again, the user files, file 2a, file 4, and file 5 may be copied (block 626) to another storage pool for backup purposes should the retrieval storage pool 724 fail or for other data management purposes. In one embodiment, retrieval pool files once copied to a backup storage pool can be marked as such in the database 113 to avoid recopying for backup in a subsequent operation of block 626. Also, the files, file 2a, file 4, and file 5, may be copied (block 630) and aggregated into a managed file. The managed file may be transferred in a data transfer operation such as storage pool backup, restore, reclamation or movement to another pool which includes migration to another location within the hierarchy 114. Thus, for example, FIG. 7D shows the files, file 2a, file 4, and file 5 aggregated as a managed file 752 and migrated to a tape drive 734 of the hierarchy 114 with the managed file 732. Again, in one embodiment, retrieval pool files once copied for aggregation may be marked as such in the database 113 to avoid recopying for aggregation in a subsequent operation of block 630.

Criteria are applied (block 634, FIG. 6) to the individual user files stored in the retrieval storage pool 724. In this example, active user files are designated (block 634) as high priority files and inactive files are designated as low priority files. Also, in this example, file 2a is the latest or active version of file 2 such that file 2 becomes an "inactive" and therefore low priority file. Thus the low priority user files including file 2 may then be deleted (block 636) from the retrieval storage pool 724 as shown in FIG. 7D, leaving the active user files file 1, file 2a, file 3, file 4, and file 5 in the retrieval storage pool 724. Should a client station 106 need file 2a to be restored to that station, file 2a may readily found in and retrieved from the retrieval storage pool 724 without accessing managed files within the hierarchy 114. Should an older version such as file 2 be needed, it may be obtained from the managed file 732 which was migrated to another location.

The priority criteria of block 634 may be periodically applied (as indicated by a return arrow 638) to the files in the retrieval storage pool 724 to identify and cull low or lower priority files from the retrieval pool 724 since files may be downgraded from high to low priority upon expiration of predetermined periods of time.

Figure 8:
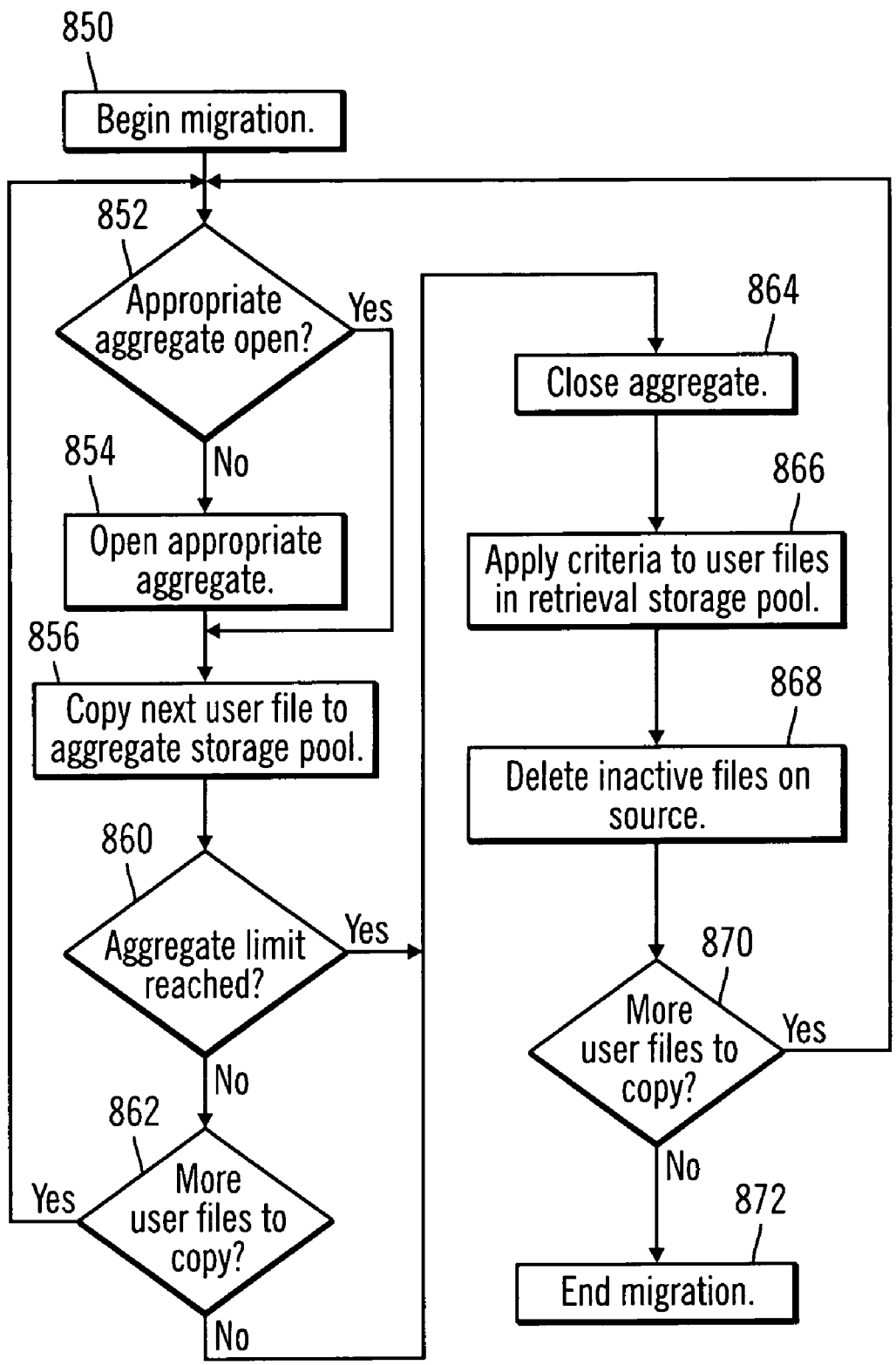
FIG. 8 illustrates a more detailed example of file culling and aggregation operations in accordance with described embodiments.

FIG. 8 shows an example of the operations of block 630 in greater detail, in which user files are aggregated and migrated. Also, FIG. 8 shows an example of the operations of blocks 634 and 636 in greater detail, in which lower priority user files are culled from the retrieval storage pool 724. As previously mentioned in connection with FIG. 4, a migration operation can move managed files from higher levels (e.g. 402, 404) to lower levels (e.g., 408, 410) in the storage hierarchy 400. Thus, migration movement may be "downward" relative to FIG. 4, thereby moving files from more expensive to less expensive storage devices. In some cases, however, migration movement may be "upward" relative to FIG. 4. This may occur, for example, in response to recent, frequent, or anticipated use of the files.

Once the migration is initiated (block 850), a determination (block 852) is made as to whether the appropriate "aggregate" has been opened for the aggregation operation. As used herein, an aggregate is a collection of individual user files being collected for combination into a single managed file. As described in U.S. Pat. No. 6,098,074, various criteria may be applied for this determination, depending upon the particular application. For example, the criteria may comprise a predetermined number of user files. For instance, a managed file may be created by including every ten user files being processed. In another example, the criteria may specify a target managed file size; when enough user files have been processed to provide the desired size of managed file, the managed file is completed.

The criteria may also consider other factors, for example grouping received user files according to their location within a client station 106. As a further enhancement, the predetermined criteria may recognize certain types of user files as being appropriate for being the sole user file in a managed file. Moreover, ordinarily skilled artisans (having the benefit of this disclosure) will recognize many completely different suitable criteria suitable, without departing from the scope of this description. Such criteria may further involve combinations and/or variations of such different criteria as well as the criteria discussed above.

If it is determined that an appropriate aggregate has not already been opened, the appropriate aggregate is opened (block 854). The next individual user file is copied (block 856) to the open aggregate at an appropriate storage pool within the storage hierarchy 114. During this copy operation, the user file is read from the retrieval pool, aggregated and copied to the aggregation storage pool. However, the aggregation, including database table updating, can occur before, during or after the copying operation.

A determination (block 860) is made as to whether the limit (such as the maximum size of the managed file or the number of user files to be aggregated in the open aggregate) has been reached. If not, a determination (block 862) is made as to whether there are additional files to be aggregated. If so, blocks 852-862 are repeated until the maximum has been reached (block 860) or there are no additional files to be aggregated (block 862). Upon reaching (block 860) the limit, the open aggregate is closed (block 864) and a managed file has been created.

As a part of the aggregation process, in the illustrated embodiment, the subsystem 102 enters a representation of the newly created managed file and its relationship to its constituent user files in various tables of the database 113. An initial representation of the user files may be made when those objects were first received and stored by the subsystem 102. As described below, these representations involve entering: (1) the user files in an inventory table (e.g., Table 1, described above, (2) the managed file in a storage table (e.g., Table 2, described above), (3) the managed file and its constituent user files in a mapping table (e.g., Table 3, described above), and (4) the managed file in a managed file attributes table (e.g., Table 4, described above).

In the example of FIG. 8, the high priority user files are the active files and the low priority files are the inactive files. Accordingly, active/inactive criteria are applied (block 866) to the individual user files stored in the retrieval storage pool 724 to identify which user files are active and which are inactive. The inactive user files may be deleted (block 868)

from the source which, in this example, is the retrieval storage pool 724. As a result, the remaining user files in the retrieval storage pool 724 may be limited to active files. Thus, for restore operations which utilize active files, such restore operations can be facilitated since the active user files may be readily found in and retrieved from the retrieval storage pool 724 without accessing managed files within the hierarchy 114. However, for those restore operations which utilize user files to be found in the managed files, those user files may be retrieved in the manner described in U.S. Pat. No. 6,098,074.

A determination (block 870) is made as to whether there are any additional files to be copied for aggregation. If so, the operations of blocks 852-870 are repeated until there are no additional files to copy (block 870) and the migration is ended (block 872). If it is determined (block 862) that there are no additional user files to copy before the aggregate limit has been reached (block 860), the aggregate may be closed (block 864) ) and treated as a managed file. In the aggregation process, the subsystem 102 may enter a representation of the newly created managed file and its constituent user files in various tables of the database 113 as discussed above.

Figure 9:
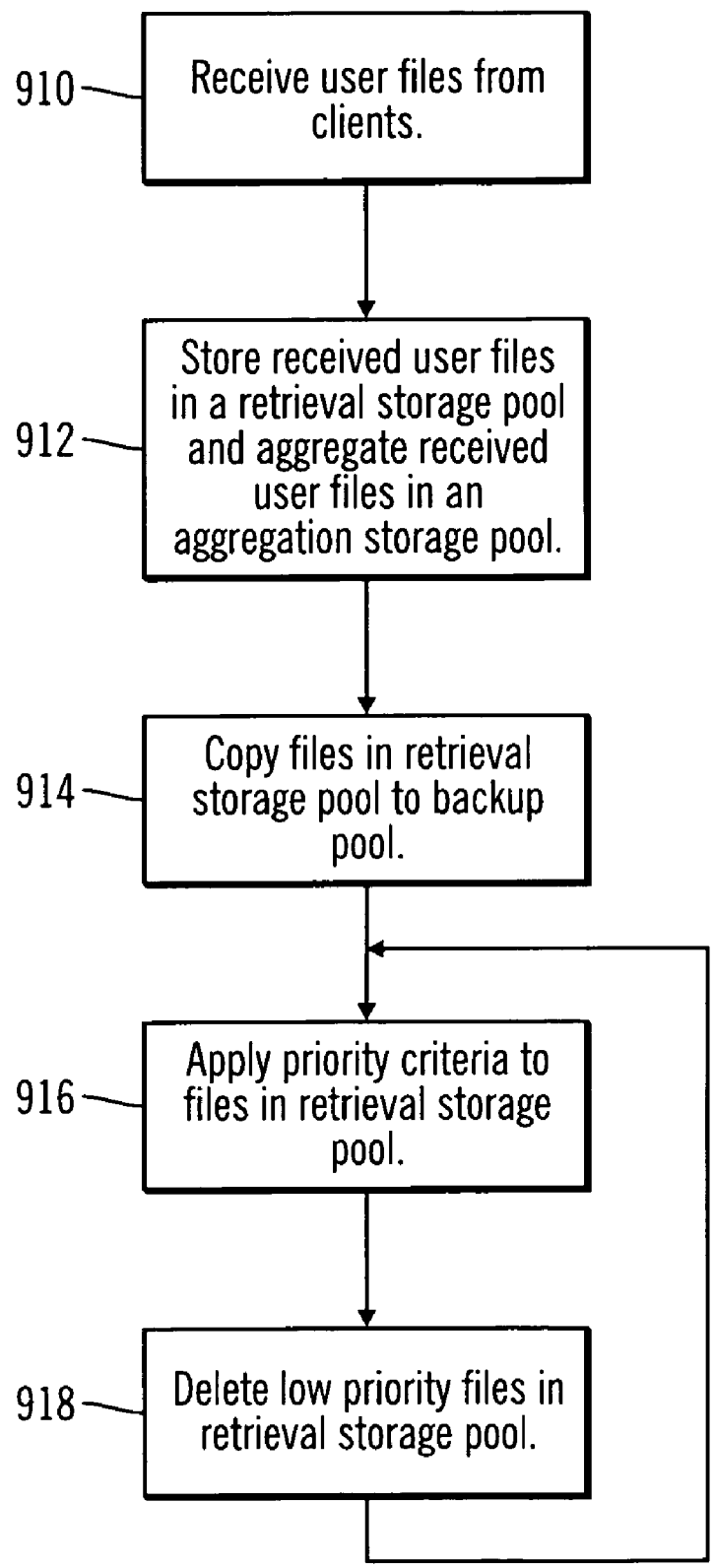
FIG. 9 shows an alternative example of operations of a data storage subsystem in accordance with described embodiments.

FIG. 9 shows an alternative example of operations of a data storage subsystem 102 which stores both nonaggregated user files and aggregated user files. In a manner similar to the operations of FIG. 6, upon the receipt (block 910) of user files from one or more client stations 106, the user files may be stored (block 912) in nonaggregated form as individual user files in a storage pool 724. In addition, the received individual user files may be simultaneously aggregated (block 912) in one or more aggregation storage pools for aggregation into one or more managed files. In this manner, the received user files are initially stored in a retrieval storage pool 724 and, in parallel, stored and aggregated in an aggregation storage pool. Again, criteria may be applied to determine the appropriate aggregation pool for the received user files to group the received user files as appropriate into various managed files. The aggregation operation may be performed before, during or after the transfer of the files to an aggregation pool.

In one embodiment, the user files may also be copied (block 914) from the retrieval storage pool 724 to another storage pool for backup purposes should the retrieval storage pool 724 fail or for other data management purposes. The backup copying operations may be performed serially or in parallel with other operations of the data storage subsystem 102 described herein. In addition, criteria are applied (block 916) to the individual user files stored in the retrieval storage pool 724 to distinguish high priority individual user files from low priority user files. The low or lower priority user files may then be culled from the retrieval storage pool 724 by "deleting" (block 918) those user files from the retrieval storage pool 724, leaving the high or higher priority user files.

Figure 10:
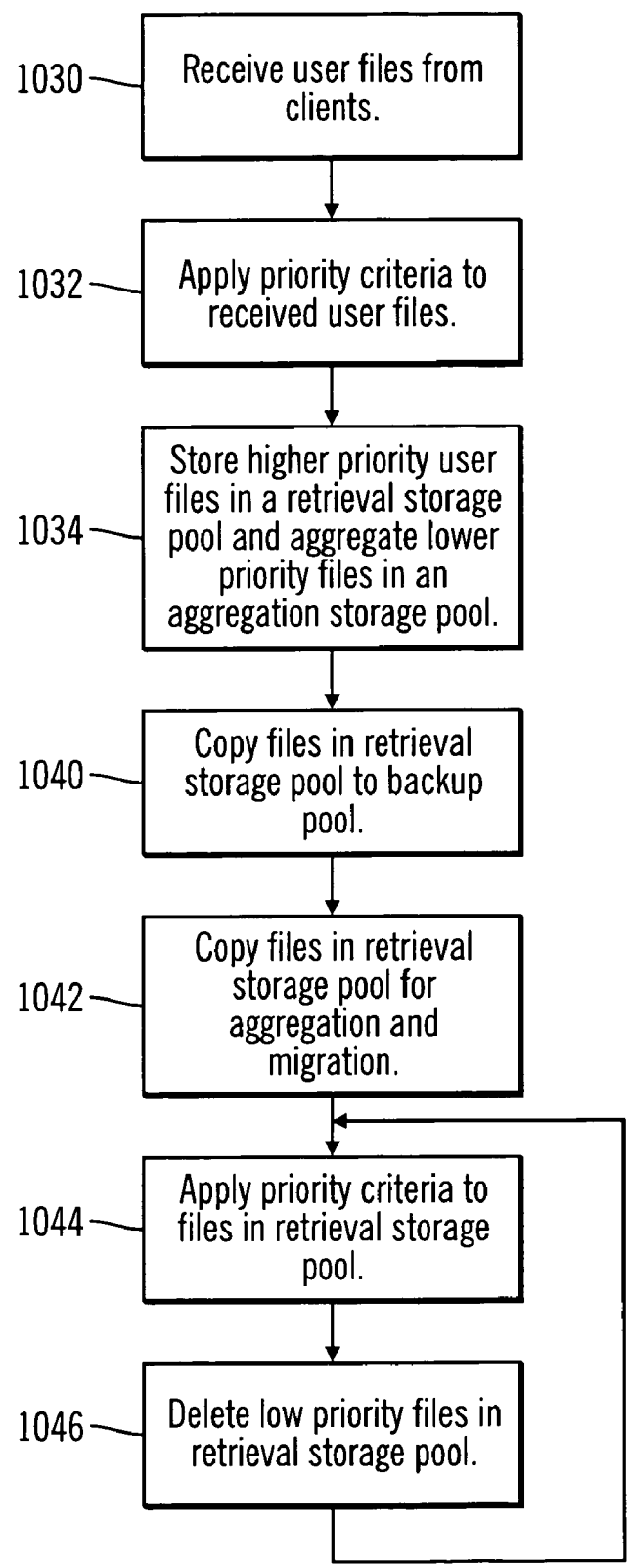
FIG. 10 shows another alternative example of operations of a data storage subsystem in accordance with described embodiments.

FIG. 10 shows another alternative example of operations of a data storage subsystem 102 which stores both nonaggregated user files and managed files, each managed file containing aggregated user files. Upon the receipt (block 1030) of user files from one or more client stations 106, criteria are applied (block 1032) to distinguish individual user files in groups of varying degrees of priority. The high or higher priority user files may be stored (block 1034) in a retrieval storage pool 724 and the low or lower priority files may be aggregated in one or more aggregation pools.

Again, various criteria may be applied to distinguish the received user files into groups of varying priority. For example, user files received from client stations 106 being used by key personnel could be designated (block 1032) as high priority and the user files received from the other client stations 106 could be designated as low priority user files. The high priority user files received from the key personnel client stations 106 could be stored (block 1034) in a retrieval storage pool 724. The low priority user files received from the other client stations 106 could be stored in one or more aggregation pools for aggregation (block 1034) in a manner similar to that discussed above. Hence, the low priority user files would not, in this example, be stored as individual user files in a retrieval storage pool 724 but would be aggregated and stored as managed files. Again, the aggregation can occur before, during or after the transfer of a user file to an aggregation storage pool. Other criteria may be used to determine which pool, retrieval or aggregation, a user file should be transferred, such as the type of file including the age or version number.

In addition to the aggregation (block 1034) of the low or lower priority user files, the high or higher priority user files stored in the retrieval storage pool 724 may also be copied (block 1040) to another storage pool for backup purposes should the retrieval storage pool 724 fail or for other data management purposes. The backup copying operations may be performed serially or in parallel with other operations of the data storage subsystem 102 described herein.

In addition to the aggregation (block 1034) of the low or lower priority user files, the files stored in the retrieval storage pool 724 may also be copied (block 1042) for aggregation into a managed file. In addition, criteria may be applied (block 1044) to the individual user files stored in the retrieval storage pool 724 to distinguish individual user files in groups of varying degrees of priority. One or more of the user files initially stored in the retrieval storage pool 724 because they were initially deemed to be high or higher priority files in a prior criteria applying operation (block 1032), may have subsequently become low or lower priority files because they have expired or have been superceded by a received later version. In which case, those user files which have become low or lower priority user files may then be culled from the retrieval storage pool 724 by "deleting" (block 1046) those user files from the retrieval storage pool 724, leaving the high or higher priority user files in the retrieval storage pool 724.

The priority criteria applied to the received user files in the operation of block 1032 may be the same or different from the priority criteria applied to the user files stored in the retrieval storage pool 724 in the criteria applying operation of block 1044.

In the illustrated embodiment, the managed files created in the aggregation operations described above are available to participate in internal data management operations, and to satisfy client requests. More particularly, the managed file (and the previously created managed files), may be used to satisfy client requests which may include many operations, such as user file delete, client retrieve, and client restore as described in U.S. Pat. No. 6,098,074.

ADDITIONAL IMPLEMENTATION DETAILS

The described techniques for managing resources may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

For example, in the context of FIGS. 1-2 the method aspect of the description provided herein may be implemented, by operating the data processing apparatus 108 (embodied by a digital data processing apparatus 200), to execute a sequence of machine-readable instructions. These instructions may reside in various types of signal-bearing media. In this respect, one aspect of the present description concerns a programmed product, comprising signal-bearing media tangibly embodying a program of machine-readable instructions executable by a digital data processor to perform a method of storing and using user files and managed files, each managed filed comprising an aggregation of one or multiple individual user files.

Figure 3:
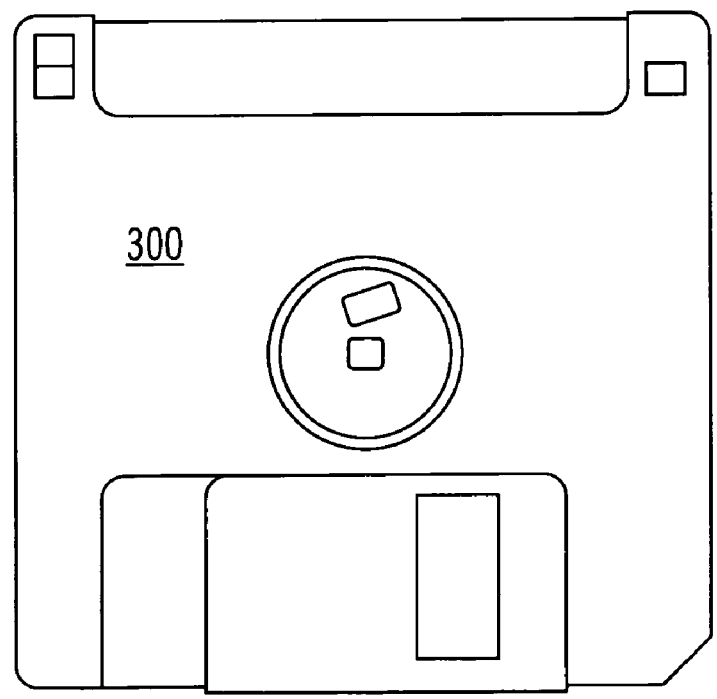
FIG. 3 shows an exemplary signal-bearing medium in accordance with described embodiments.

Illustratively, this signal-bearing media may comprise RAM contained within the data processing apparatus 108, as represented by the fast-access storage 206 for example. Alternatively, the instructions may be contained in another signal-bearing media, such as a magnetic data storage diskette 300 (FIG. 3), directly or indirectly accessible by the processing unit 202. Whether contained in the digital data processing apparatus 200 or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as C, C++, PLX, etc.

The illustrated logic of FIGS. 6, and 8-10 show certain events occurring in a certain order. In alternative implementations, certain operations may be performed in a different order, modified or removed. Moreover, operations may be added to the above described logic and still conform to the described implementations. Further, operations described herein may occur sequentially or certain operations may be processed in parallel. Yet further, operations may be performed by a single processing unit or by distributed processing units.

Figure 11:
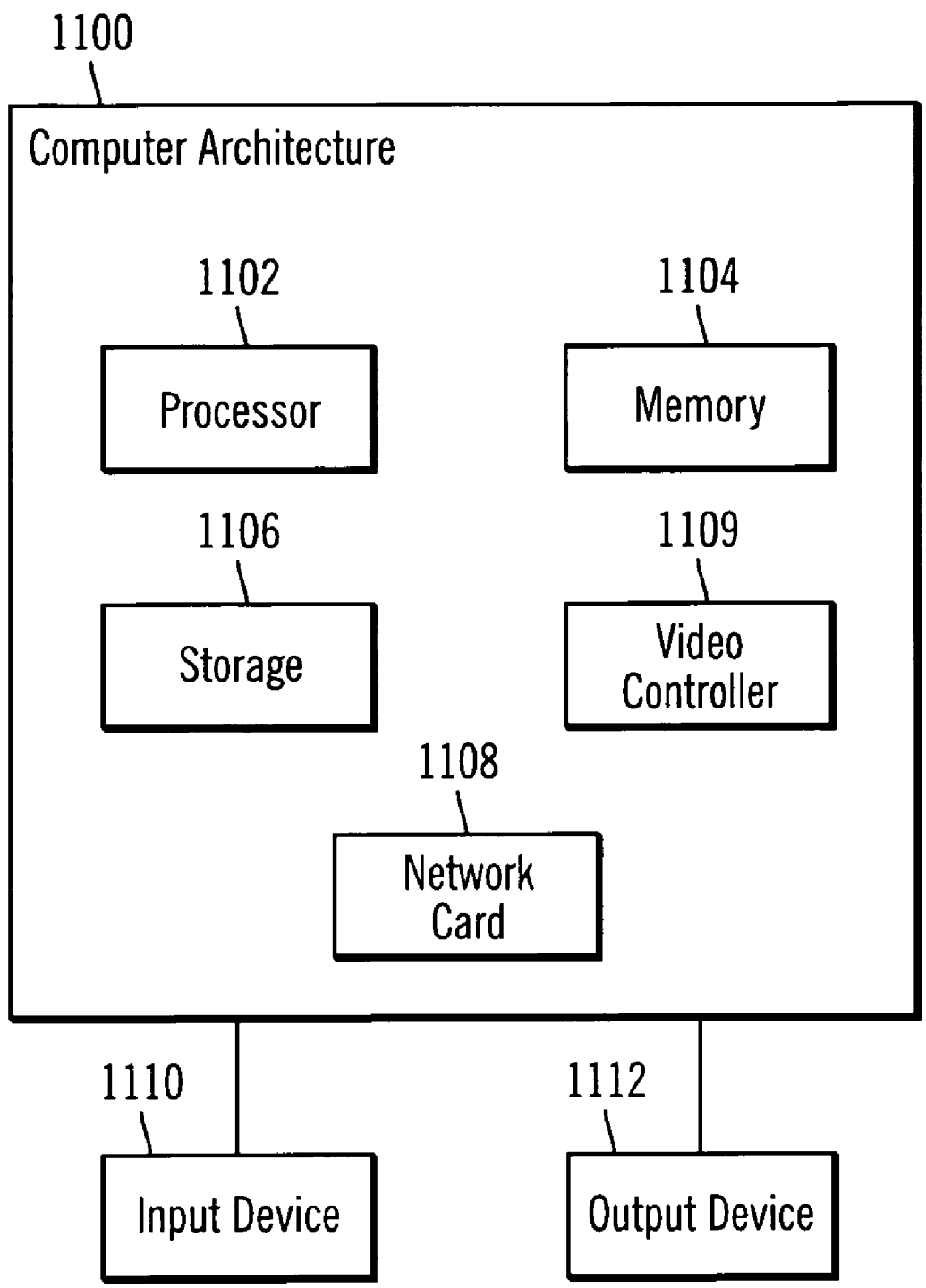
FIG. 11 illustrates an architecture of computing components in a network environment, such as the hosts, storage controllers, clusters, and any other computing devices.

FIG. 11 illustrates one implementation of a computer architecture 1100 of the network components, such as the data storage subsystem 102, administrator stations 104 or client stations 106 shown in FIG. 1. The architecture 1100 may include a processor 1102 (e.g., a microprocessor), a memory 1104 (e.g., a volatile memory device), and storage 1106 (e.g., a nonvolatile storage, such as magnetic disk drives, optical disk drives, a tape drive, etc.). The storage 1106 may comprise an internal storage device or an attached or network accessible storage. Programs in the storage 1106 are loaded into the memory 1104 and executed by the processor 1102 in a manner known in the art. The architecture further includes a network card 1108 to enable communication with a network. A video controller 1109 controls a visual display. An input device 1110 is used to provide user input to the processor 1102, and may include a keyboard, mouse, pen-stylus, microphone, touch sensitive display screen, or any other activation or input mechanism known in the art. An output device 1112 is capable of rendering information transmitted from the processor 1102, or other component, such as a display monitor, printer, storage, etc.

The foregoing description of various implementations of the present disclosure has been presented for the purposes of illustration and description. It is not intended to be exhaustive or to limit the present description to the precise form disclosed. Many modifications and variations are possible in light of the above teaching. It is intended that the scope be limited not by this detailed description, but rather by the claims appended hereto.

What is claimed is:

1. A data backup management method, comprising:
receiving multiple user files from at least one client station coupled to a data storage subsystem;
storing at least some of the multiple user files in a retrieval storage pool at a first location in the data storage subsystem;
creating a managed file comprising an aggregation of at least some of the multiple user files;
applying first predetermined criteria to a user file stored in the retrieval storage pool to designate the user file in the retrieval storage pool as one of a higher priority and a lower priority wherein said first predetermined criteria include the status of the user file as one of active and inactive wherein an active user file currently resides on said client station and is designated a higher priority user file, and an inactive user file once resided on a client station but had been subsequently at least one of modified and deleted on said client station, and is designated a lower priority user file; and
deleting from said retrieval storage pool a user file designated as lower priority.

2. The method of claim 1 further comprising retaining in said retrieval storage pool a user file designated as higher priority.

3. The method of claim 1 wherein said retrieval storage pool is located in a disk storage.

4. The method of claim 1 wherein said managed file creating includes copying user files to an aggregation storage pool and designating the aggregation of user files in the aggregation storage pool as a single file in a database.

5. The method of claim 4 further comprising transferring said managed file from said aggregation storage pool to another location within a data hierarchy in the data storage subsystem.

6. The method of claim 4 wherein said copying includes copying user files from the retrieval storage pool to the aggregation storage pool.

7. The method of claim 4 wherein said aggregation storage pool is located in a tape storage.

8. The method of claim 5 wherein said managed file is migrated to a tape storage.

9. The method of claim 1 further comprising copying received user files to an aggregation storage pool wherein said managed file creating includes creating a managed file comprising a contiguous aggregation of said user files copied to said aggregation storage pool.

10. A data backup management method, comprising:
receiving multiple user files from at least one client station coupled to a data storage subsystem;
storing at least some of the multiple user files in a retrieval storage pool at a first location in the data storage subsystem;
creating a managed file comprising an aggregation of at least some of the multiple user files;
applying first predetermined criteria to a user file stored in the retrieval storage pool to designate the user file in the retrieval storage pool as one of a higher priority and a lower priority wherein said first predetermined criteria include the status of the user file as one of active and inactive wherein an active user file currently resides on said client and is designated a higher priority user file, and an inactive user file once resided on a client station but has been subsequently at least one of modified and deleted on said client station, and is designated a lower priority user file; and
deleting from said retrieval storage pool a user file designated as lower priority;
copying received user files to an aggregation storage pool wherein said managed file creating includes creating a managed file comprising a contiguous aggregation of said user files copied to said aggregation storage pool; and
applying second predetermined criteria to a user file received from a client station to designate the received user file as one of a higher priority and a lower priority, and wherein said storing includes storing received user file designated as higher priority in said retrieval storage pool, and wherein said copying to an aggregation storage pool includes copying received user file designated as lower priority to said aggregation storage pool.

11. The method of claim 10 wherein each client station has an identity and said second predetermined criteria include the identity of the client station which was the source of a received user file wherein a user file received from a first client station is designated a higher priority user file and is stored in said retrieval storage pool, and a user file received from a second client station is designated a lower priority user file and is stored in said aggregation storage pool.

12. A data backup management method, comprising:
receiving multiple user files from at least one client station coupled to a data storage subsystem;
storing at least some of the multiple user files in a retrieval storage pool at a first location in the data storage subsystem;
creating a managed file comprising an aggregation of at least some of the multiple user files, wherein said managed file creating includes copying user files to an aggregation storage pool and designating the aggregation of user files in the aggregation storage pool as a single file in a database;
applying first predetermined criteria to a user file stored in the retrieval storage pool to designate the user file in the retrieval storage pool as one of a higher priority and a lower priority wherein said first predetermined criteria include the status of the user file as one of active and inactive wherein an active user file currently resides on said client station and is designated a higher priority user file, and an inactive user file once resided on a client station but has been subseciuently at least one of modified and deleted on said client station, and is designated a lower priority user file;
deleting from said retrieval storage pool a user file designated as lower priority; and
retaining in said retrieval storage pool a user file designated as higher priority.

13. The method of claim 12 further comprising applying second predetermined criteria to a user file received from a client station to designate the received user file as one of a higher priority and a lower priority, and wherein said storing includes storing received user file designated as higher priority in said retrieval storage pool, and wherein said copying to an aggregation storage pool includes copying received user file designated as lower priority to said aggregation storage pool.

14. A data backup management method, comprising:
receiving multiple user files from at least one client station coupled to a data storage subsystem;
applying first predetermined criteria to a user file received from a client station to designate the received user file as one of a higher priority and a lower priority;
storing user files designated a higher priority in a retrieval storage pool in a disk storage in the data storage subsystem;
creating a managed file comprising a contiguous aggregation of multiple user files each designated lower priority, wherein said managed file creating includes copying lower priority user files to an aggregation storage pool in a tape drive and designating the aggregation of user files in the aggregation storage pool as a single file in a database;
applying second predetermined criteria to a user file stored in the retrieval storage pool to designate the user file in the retrieval storage pool as one of active and inactive wherein an active user file currently resides on said client station and is designated a higher priority user file, and an inactive user file once resided on a client station but has been subsequently at least one of modified and deleted on said client station, and is designated a lower priority user file;
deleting from said retrieval storage pool a user file designated as inactive; and
retaining in said retrieval storage pool a user file designated as active;
wherein each client station has an identity and said first predetermined criteria include the identity of the client station which was the source of a received user file wherein a user file received from a first client station is designated a higher priority user file and is stored in said retrieval storage pool, and a user file received from a second client station is designated a lower priority user file and is stored in said aggregation storage pool.

* * * * *